(12) United States Patent
Chen et al.

(10) Patent No.: US 10,865,596 B2
(45) Date of Patent: *Dec. 15, 2020

(54) DAMPING DEVICE AND FURNITURE PART COMPRISING THE SAME

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 124 days.

This patent is subject to a terminal disclaimer.

(21) Appl. No.: 15/976,820

(22) Filed: May 10, 2018

(65) Prior Publication Data
US 2019/0133320 A1    May 9, 2019

(30) Foreign Application Priority Data

Nov. 6, 2017    (TW) .............................. 106138525 A

(51) Int. Cl.
| E05F 5/02 | (2006.01) |
| E05F 5/10 | (2006.01) |
| E05F 1/16 | (2006.01) |
| F16F 13/00 | (2006.01) |
| E05F 3/12 | (2006.01) |

(Continued)

(52) U.S. Cl.
CPC ................ *E05F 5/027* (2013.01); *E05F 1/16* (2013.01); *E05F 5/10* (2013.01); *E05F 3/12* (2013.01); *E05Y 2201/22* (2013.01); *E05Y 2201/232* (2013.01); *E05Y 2201/256* (2013.01); *E05Y 2201/458* (2013.01); *E05Y 2800/24* (2013.01); *E05Y 2900/20* (2013.01); *F16F 9/348* (2013.01);

(Continued)

(58) Field of Classification Search
CPC ........ F16F 9/348; F16F 9/3484; F16F 13/007; A47B 88/477; A47B 88/46; E05F 5/10; E05F 5/027; E05F 1/16
USPC ........... 16/51, 52, 56, 57, 58, 82, 83, 84, 85
See application file for complete search history.

(56) References Cited

U.S. PATENT DOCUMENTS

| 3,833,248 A | * | 9/1974 | Wossner ................. B60R 19/32 |
| | | | 293/134 |
| 6,802,408 B2 | | 10/2004 | Krammer |

(Continued)

FOREIGN PATENT DOCUMENTS

| DE | 10 2006 030 064 A1 | 1/2008 |
| DE | 10 2013 104 886 A1 | 11/2014 |

(Continued)

*Primary Examiner* — Jeffrey O'Brien
(74) *Attorney, Agent, or Firm* — Winston Hsu

(57) ABSTRACT

A damping device includes a housing, a piston and a controller. The housing defines a chamber filled with a damping medium. The piston is movable in the chamber and includes a passage for allowing the damping medium to pass through. The controller includes a control member and a resilient member. The control member is capable of being moved toward the passage of the piston or closing a portion or all portions of the passage of the piston in response to a speed of the piston.

14 Claims, 18 Drawing Sheets

(51) Int. Cl.
 *F16F 9/48* (2006.01)
 *F16F 9/348* (2006.01)
(52) U.S. Cl.
 CPC ............. *F16F 9/3484* (2013.01); *F16F 9/483* (2013.01); *F16F 13/007* (2013.01)

(56) References Cited

U.S. PATENT DOCUMENTS

| | | | |
|---|---|---|---|
| 7,100,907 | B2 | 9/2006 | Fitz |
| 8,172,345 | B2 | 5/2012 | Liang |
| 8,181,758 | B2 | 5/2012 | Liang |
| 8,308,251 | B2 | 11/2012 | Liang |
| 8,468,652 | B2 * | 6/2013 | Salice ................. F16F 9/19 16/82 |
| 9,695,900 | B2 * | 7/2017 | Roessle ............. F16F 9/5126 |
| 2003/0141638 | A1 * | 7/2003 | Salice ............... F16F 9/0209 267/34 |
| 2015/0204129 | A1 | 7/2015 | Park |

FOREIGN PATENT DOCUMENTS

| | | |
|---|---|---|
| EP | 1 756 446 B1 | 3/2008 |
| EP | 2 472 140 A1 | 7/2012 |
| JP | S61-12894 U | 1/1986 |
| JP | 2009-270597 A | 11/2009 |
| JP | WO2013/073489 A1 | 4/2015 |
| JP | 2016-69871 A | 5/2016 |
| JP | 2016-516495 A | 6/2016 |
| JP | 2017-155578 A | 9/2017 |

* cited by examiner

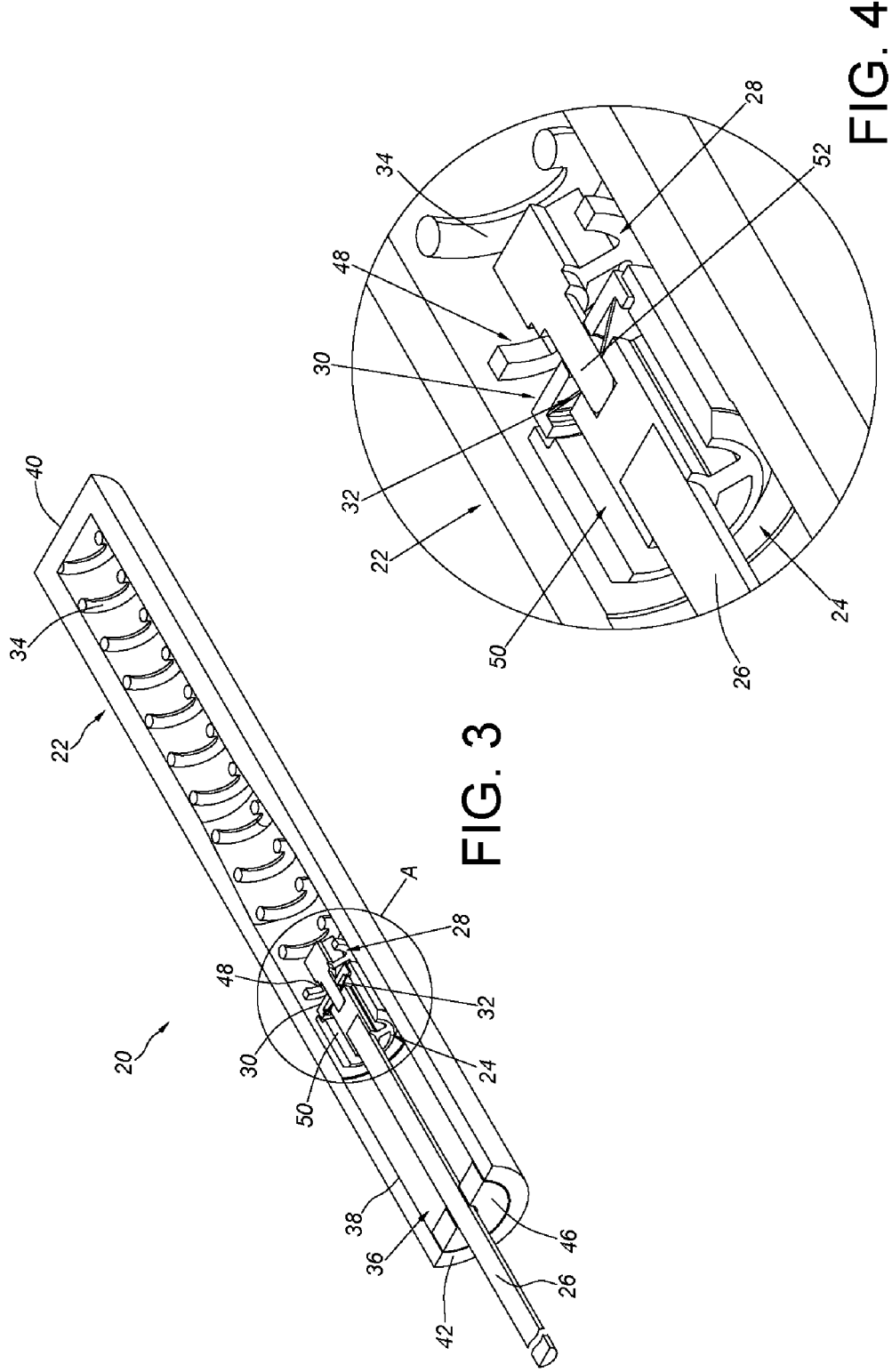

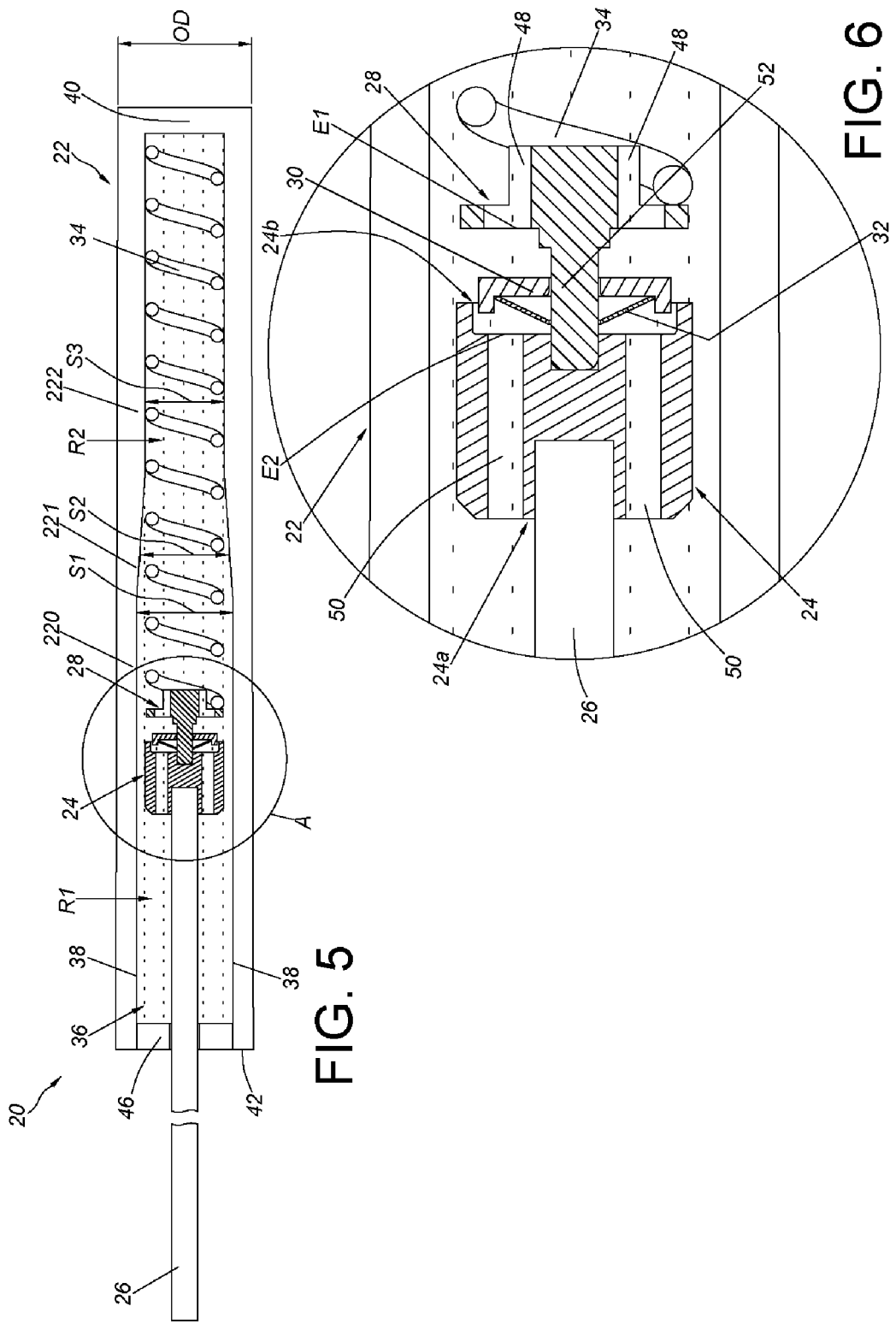

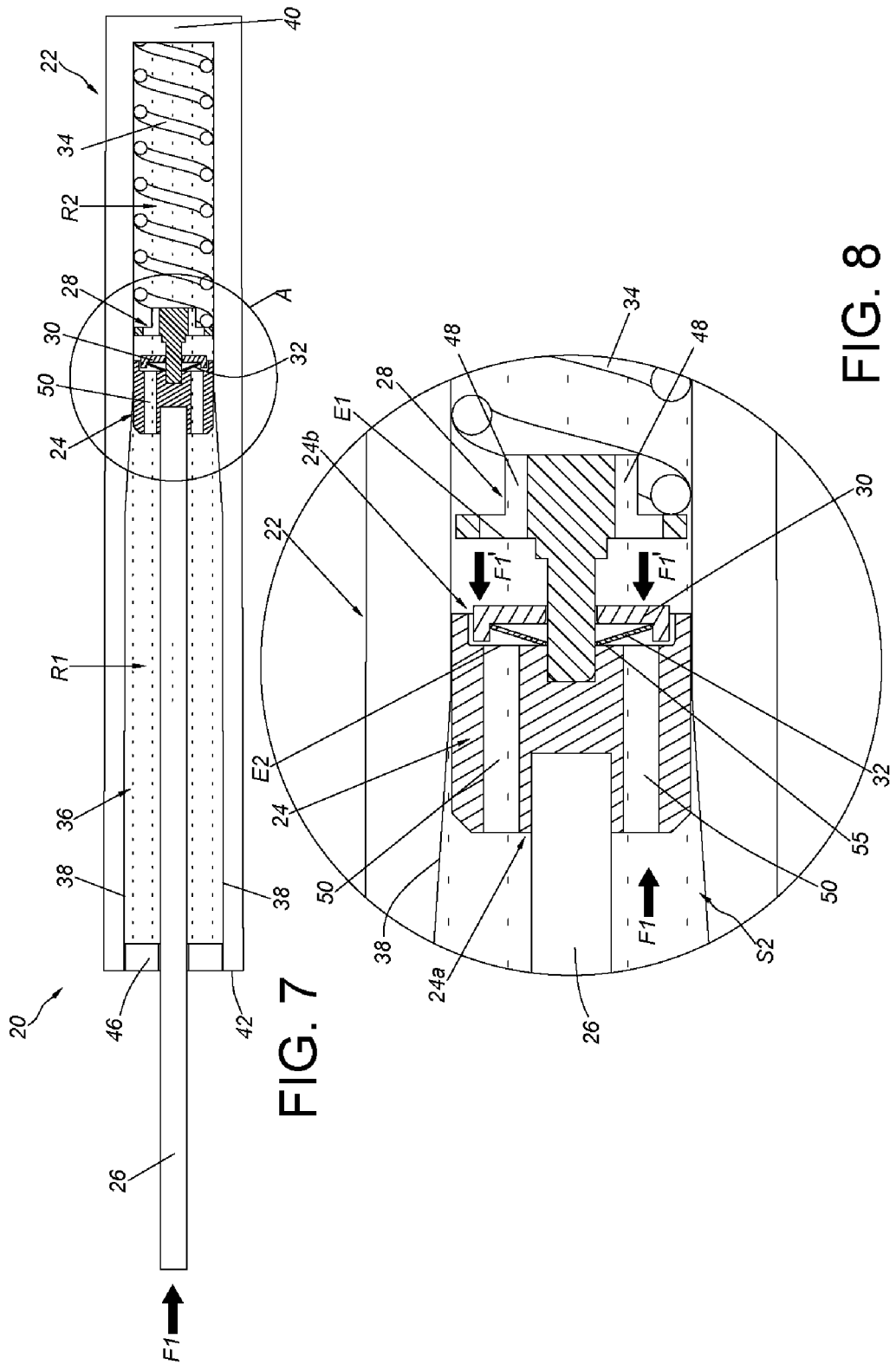

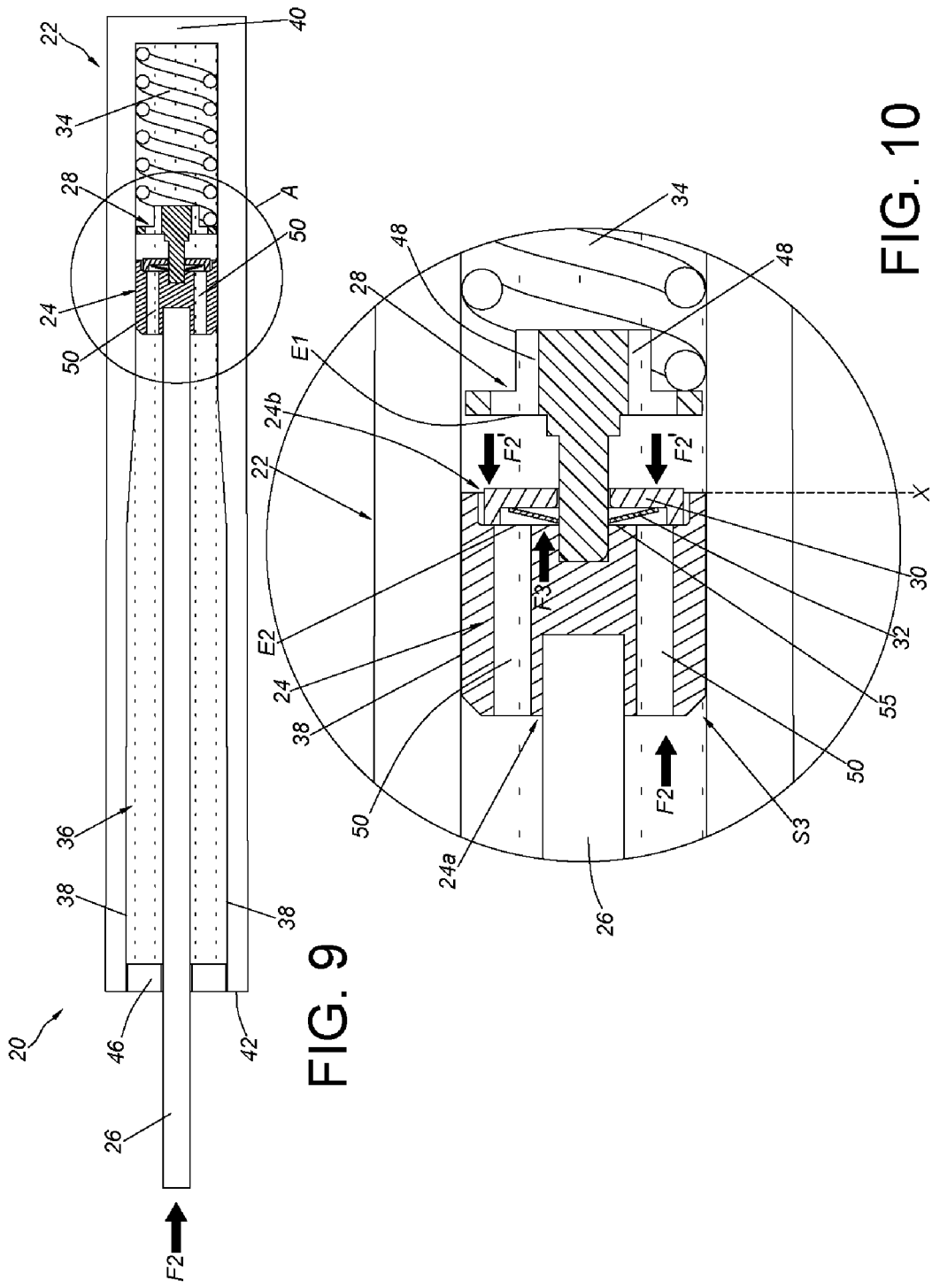

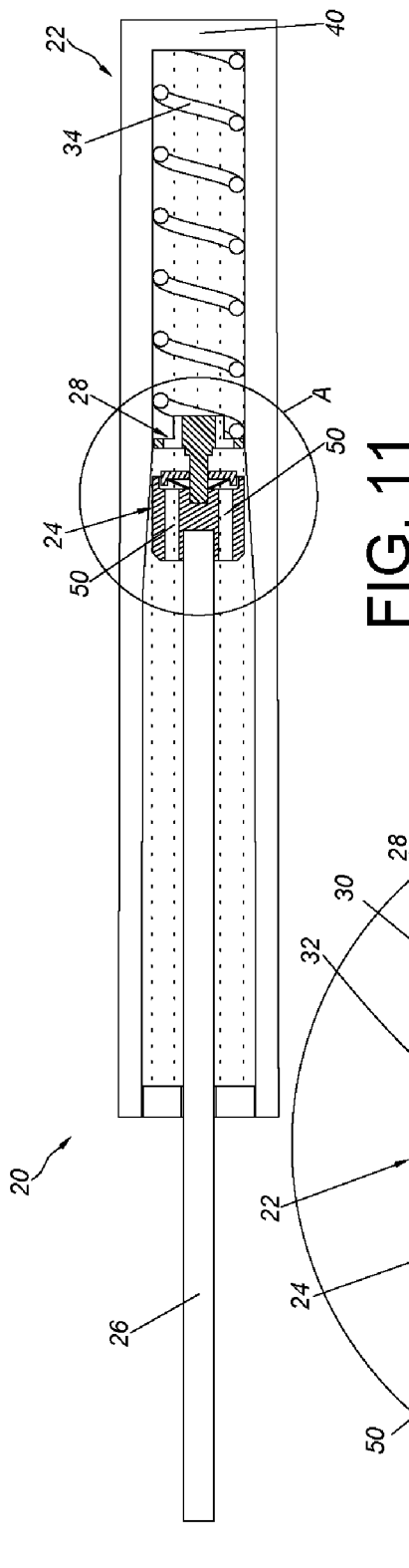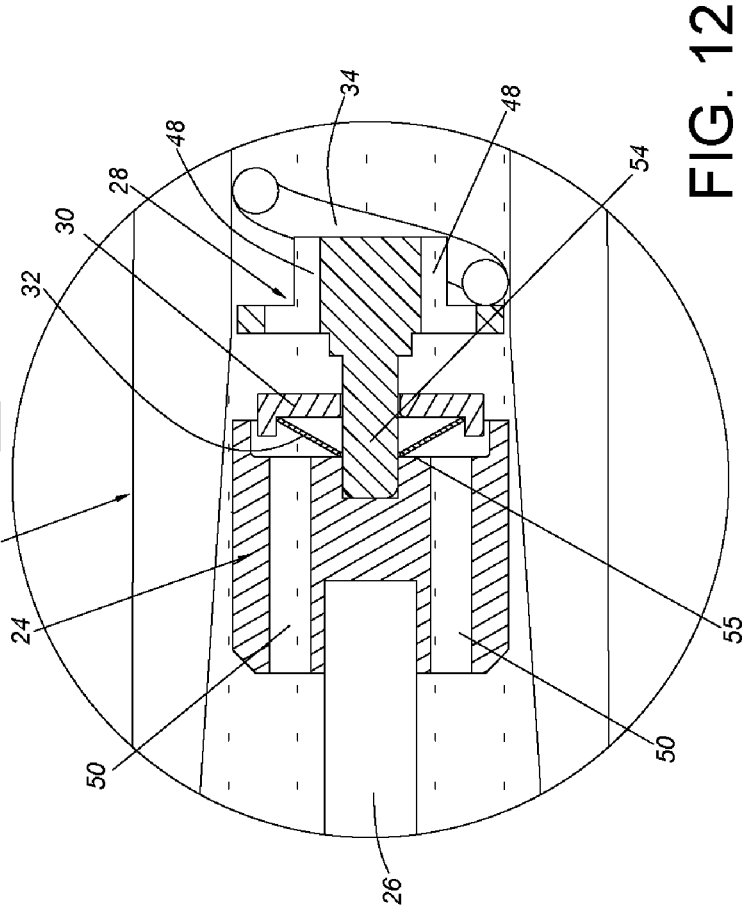
FIG. 11
FIG. 12

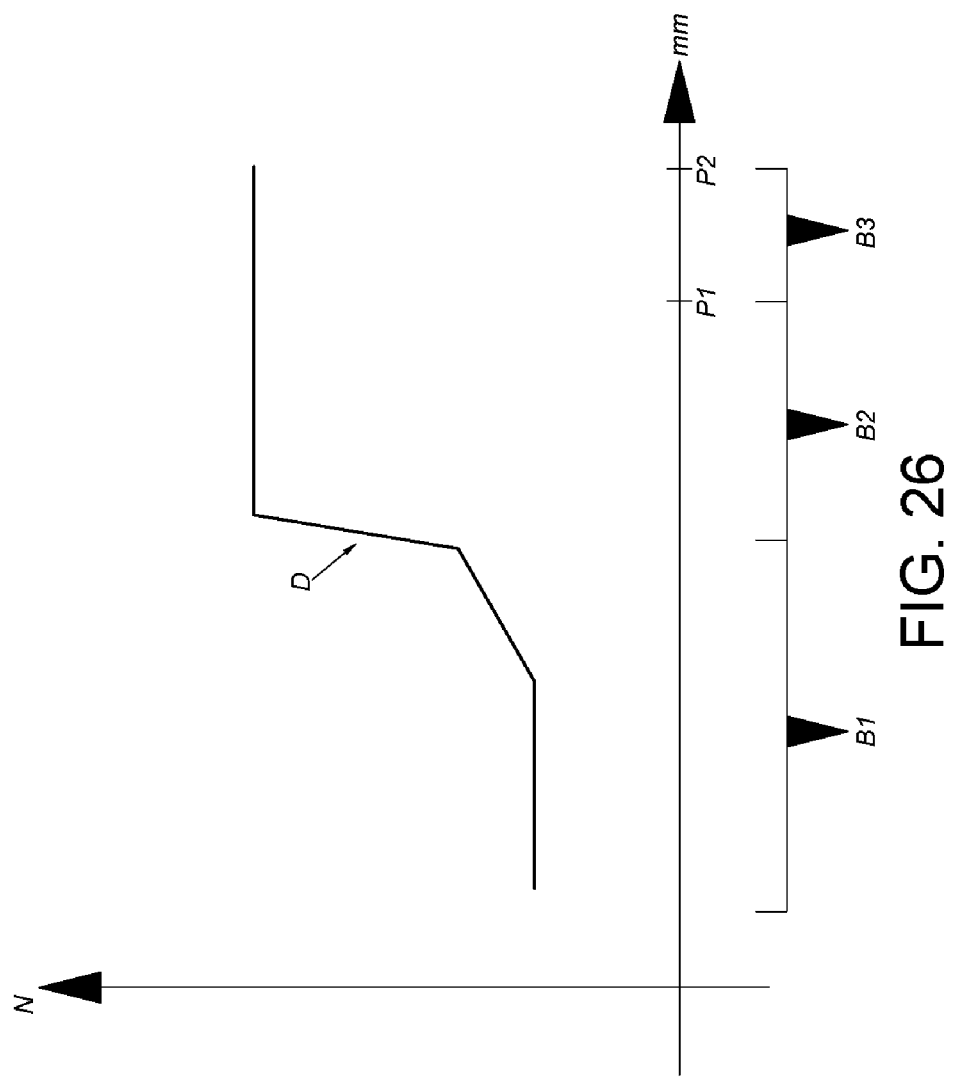

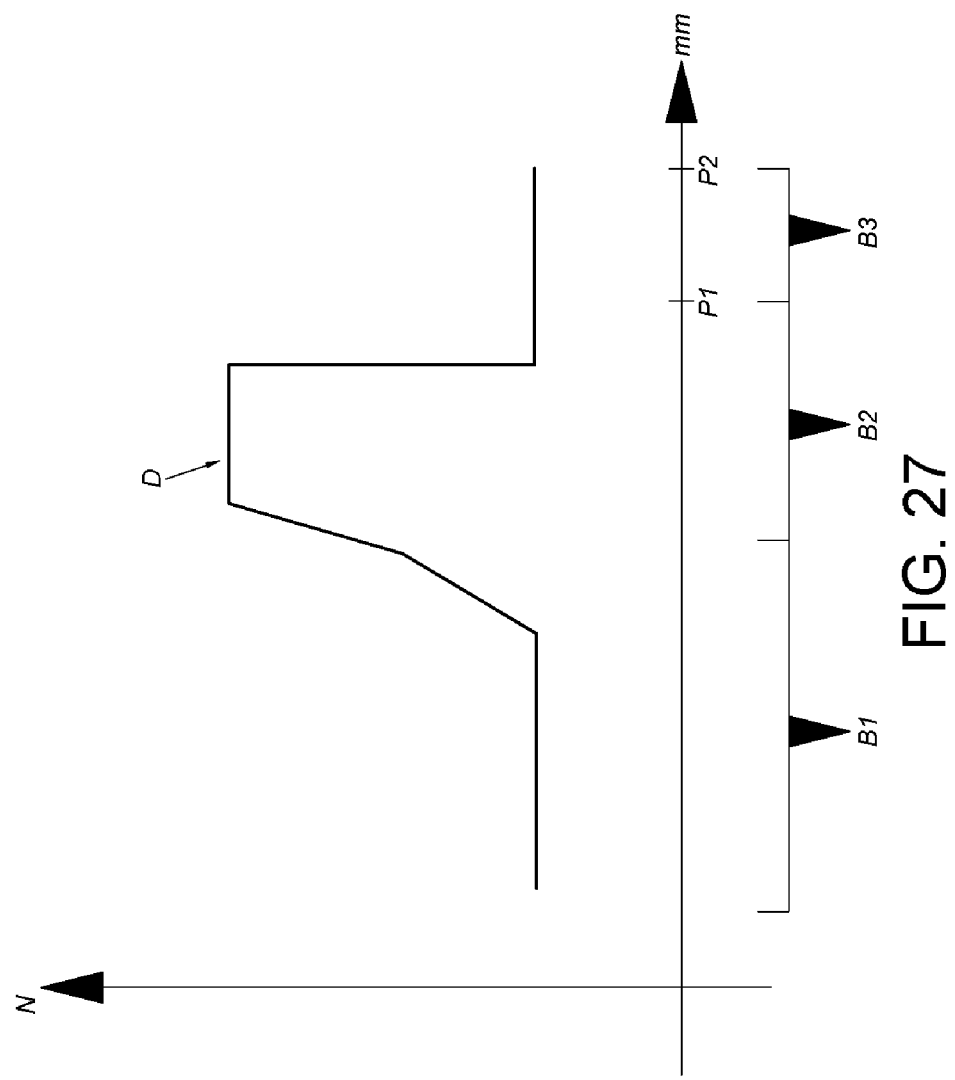

DAMPING DEVICE AND FURNITURE PART COMPRISING THE SAME

BACKGROUND OF THE INVENTION

1. Field of the Invention

The present invention relates to a damping device, and more particularly, to a damping device adapted to a movable furniture part.

2. Description of the Prior Art

US patent with Patent No. U.S. Pat. No. 8,181,758 B2 discloses a damping device including a cylinder (10). The cylinder (10) is filled with a damping medium. A resilient member (20) is disposed in the cylinder (10) and a piston (40) is movably mounted in the cylinder (10). The piston (40) includes a piston body (42), a connection portion (44) connected to an end of the resilient member (20) and a neck portion (46) connected between the piston body (42) and the connection portion (44). A control valve (60) is movably mounted to the neck portion (46) of the piston (40), wherein the control valve (60) is able to control a traveling velocity of the piston (40) by closing or detaching from openings with respect to the piston body (42).

The damping device disclosed in the US patent with Patent No. U.S. Pat. No. 8,181,758 B2 can be implemented in a wide range of use, for example, a drawer slide rail assembly of a furniture or a server slide rail assembly of a rack system. The said slide rail assemblies have functions of push-open and/or self-close. Herein, the damping device facilitates decreasing a retracting speed by which the slide rail assembly (or a drawer) moves during a final step of process where the slide rail (or the drawer) moves from an extended state (or an open state) to a retracted state (or a closed state) relative to another slide rail (or a cabinet body). For example, US patent with Patent No. U.S. Pat. No. 8,172,345 B2 discovers a so-called push-open mechanism that facilitates the drawer, as being in a closed position, to be opened relative to the cabinet body by the drawer being pushed, and a so-called self-close mechanism that facilitates the drawer to be closed by itself during the final step of a process where the drawer is moved from an open position to a closed position. In addition, US patent with Patent No. U.S. Pat. No. 8,308,251 B2 discovers a design where intensity of push-open mechanism can be adjusted. The said three patents are incorporated herein for references.

However, when force exerted by users to close the drawer from an open position is excessive, or when the force is continuously applied as the drawer reaches the cabinet body, the drawer may pass the closed position of the cabinet body to an over-pressed position. As a result, the drawer will be re-opened by the push-open mechanism, resulting in failure of the drawer being closed relative to the cabinet. The present invention is provided to improve the abovementioned issues.

SUMMARY OF THE INVENTION

The present invention provides a damping device capable of generating a damping force in response to an exerted external force.

According to an aspect of the present invention, a damping device includes a housing, a piston and a controller. The housing has an inner wall, and a chamber is defined by the inner wall. The chamber has a damping medium filled therewith. The piston is movable in the chamber of the housing and includes at least one passage for allowing the damping medium to pass through. The controller is arranged in the chamber of the housing and includes a control member and a resilient member. When the piston is moved relative to the housing by a damping speed, the control member is moved toward the passage of the piston or closes a portion or all portions of the passage of the piston in response to the damping speed. When the control member closes the portion or the all portions of the passage of the piston, the control member is capable of controlling an amount of the damping medium passing through the passage of the piston.

Preferably, the resilient member generates a resilient force to the control member in response to the damping speed.

Preferably, the damping device further includes a base movable in the chamber, and the controller is disposed between the piston and the base, wherein the base is connected to the piston via an extending portion, and the controller is movably mounted on the extending portion.

Preferably, the piston is moved in the chamber of the housing in a substantially linear direction.

Preferably, the resilient member is a disc spring.

Preferably, the control member defines a space, and the space is for accommodating the resilient member.

Preferably, the piston includes a connecting portion and a contacting portion. The connecting portion and the contacting portion are spaced by a step difference. The base is connected to the connecting portion of the piston via the extending portion, and the resilient member deforms elastically through the step difference.

Preferably, the control member and the resilient member are integrally formed as a part.

Preferably, the control member and the resilient member are separate parts.

Preferably, the damping device further includes a spring for providing an elastic force to one of the piston and the base.

Preferably, the inner wall has a first inner diameter and a second inner diameter from a top portion to a bottom portion of the housing, and the first inner diameter is greater than the second inner diameter.

Preferably, the inner wall has the first inner diameter, the second inner diameter and a third inner diameter from the top portion to the bottom portion of the housing, and the second inner diameter is greater than the third inner diameter.

Preferably, the inner wall has the first inner diameter, the second inner diameter and a third inner diameter from the top to the bottom of the housing, and the third inner diameter is greater than the second inner diameter.

According to another aspect of the present invention, a damping device includes a housing, a piston, a base and a controller. The housing defines a chamber, and the chamber has a damping medium filled therewith. The piston is movable in the chamber. The base is movable in the chamber with the piston. Both of the base and the piston include a passage respectively for allowing the damping medium to pass through. The controller is located between the passage of the base and the passage of the piston.

According to another aspect of the present invention, a furniture part including a first furniture member, a second furniture member, an ejection device, a retraction device and a damping device is provided. The ejection device is configured to provide an opening force for the second furniture to be moved in a second direction, which is opposite to a first direction, to a third position in response to the opening force when the second furniture member is moved relative to the first furniture from a first position to a second position in the first direction. The retraction device provides a closing force for the second furniture member to be moved toward the first position during a final step where the second furniture member is moved relative to the first furniture member from the third position close to the first position in the first direction. The damping device is configured to provide a damping effect during a process where the second furniture member is moved toward the first position in response to the closing force. The damping device includes a housing, a piston, a base and a controller. The housing defines a chamber, and the chamber has a damping medium filled therewith. The piston is movable in the chamber and includes a passage for allowing the damping medium to pass through. The base is movable in the chamber. The controller is located between the piston and the base and includes a control member and a resilient member, wherein the control member is configured to close a portion or all portions of the passage of the piston. The resilient member is configured to provide a resilient force for the control member to no longer close the passage of the piston.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a half-section view of the damping device according to the first embodiment of the present invention.

FIG. 4 is an enlarged drawing of the zone A shown in FIG. 3.

FIG. 5 is an internal diagram of the damping device according to the first embodiment of the present invention.

FIG. 6 is an enlarged drawing of the zone A shown in FIG. 5.

FIG. 7 is a diagram showing that one of a piston and a housing of the damping device is able to be displaced due to a force according to the first embodiment of the present invention.

FIG. 8 is an enlarged drawing of the zone A shown in FIG. 7.

FIG. 9 is a diagram showing a control member closing a passage of the piston of the damping device according to the first embodiment of the present invention.

FIG. 10 is an enlarged drawing of the zone A shown in FIG. 9.

FIG. 11 is a diagram showing that the control member of the damping device no longer closes the passage of the piston according to the first embodiment of the present invention.

FIG. 12 is an enlarged drawing of the zone A shown in FIG. 11.

FIG. 26 is a diagram of the damping force provided by the damping device under a second condition according to the first embodiment of the present invention.

FIG. 27 is a diagram of the damping force provided by the damping device under a third condition according to the first embodiment of the present invention.

DETAILED DESCRIPTION

Figure 1:
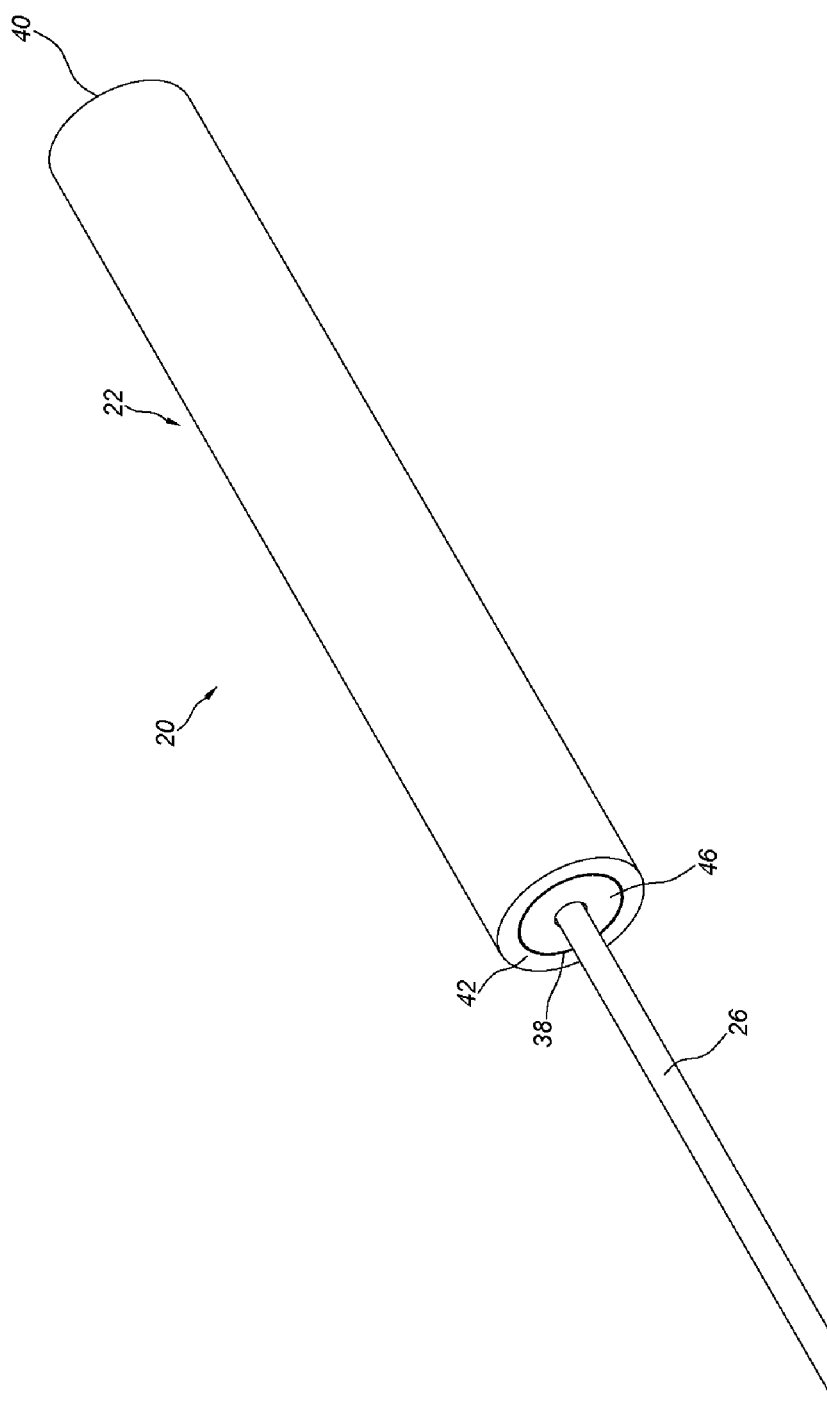
FIG. 1 is a perspective diagram of the damping device according to a first embodiment of the present invention.
Figure 2:
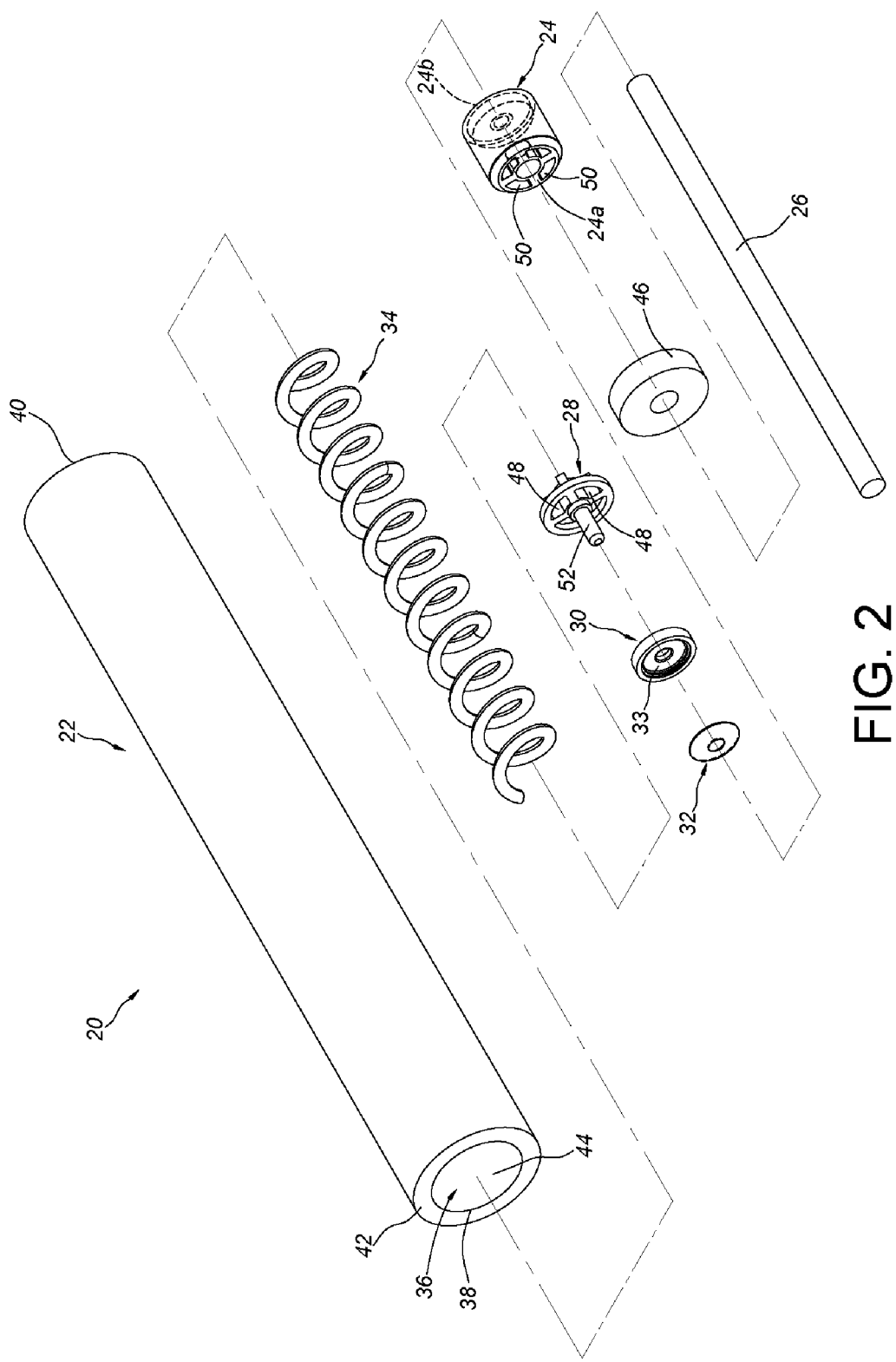
FIG. 2 is an exploded diagram of the damping device according to the first embodiment of the present invention.

FIG. 1 to FIG. 3 are diagrams illustrating a damping device 20 according to a first embodiment of the present invention. The damping device 20 includes a housing 22, a piston 24, a base 28, a control member 30 and a resilient member 32. Preferably, the damping device 20 further includes an extending member 26 and a spring 34.

The housing 22 has an inner wall 38, and a chamber 36 is defined by the inner wall 38. The housing 22 includes a bottom portion 40 and a top portion 42. Preferably, the bottom portion 40 is a closed end, and the top portion 42 has an opening 44 communicating with the chamber 36. Besides, the damping device 20 further includes a cover 46 configured to close the opening 44.

The piston 24 is movable in the chamber 36. Specifically, the piston 24 is moved in the chamber 36 of the housing 22 in a substantially linear direction. On the other hand, the extending member 26 is movable relative to the housing 22 via the piston 24. Specifically, one end of the extending member 26 is connected to a first side 24a of the piston 24, and another end of the extending member 26 passes through the cover 46 and partially extends out of the chamber 36.

The base 28 can be moved in the chamber 36 with the piston 24. Preferably, the base 28 is connected to a second side 24b of the piston 24, wherein the second side 24b is opposite to the first side 24a. Besides, the base 28 and/or the piston 24 include at least one passage. Hereinafter, the base 28 and the piston 24 respectively including a plurality of passages 48 and a plurality of passages 50 are illustrative of an example, as shown in FIG. 2, but the present invention is not limited thereto.

The control member 30 and the resilient member 32 can be deemed as a controller. Specifically, the control member 30 and the resilient member 32 are located between the piston 24 and the base 28. In the present embodiment, the control member 30 and the resilient member 32 are two separate parts. Preferably, the control member 30 defines a space 33, and the space 33 is configured to accommodate the resilient member 32. The control member 30 and the resilient member 32 are movable between the base 28 and the piston 24. Hereinafter, the resilient member 32, for example, is a disc spring, but it is not limited thereto.

The spring 34 is configured to provide an elastic force to the piston 24. Hereinafter, the spring 34 providing the elastic force to the piston 24 via the base 28 is illustrative of an example. In other words, the elastic force generated by the spring 34 is exerted to the piston 24 and the base 28.

As shown in FIG. 4, the base 28 is connected to the piston 24 via an extending portion 52, wherein the control member 30 and the resilient member 32 are movably mounted to the extending portion 52.

As shown in FIG. 5 and FIG. 6, the piston 24 and the housing 22 are in a pre-damping state. At this time, the piston 24 and the chamber 36 between the piston 24 and the top portion 42 of the housing 22 define a first zone R1, and the piston 24 and the chamber 36 between the piston 24 and the bottom portion 40 of the housing 22 define a second zone R2. The extending member 26 is able to partially extend out of the chamber 36 of the housing 22 rapidly by the elastic force generated by the spring 34. Moreover, the chamber 36 of the housing 22 is filled with a damping medium. The said damping medium includes a fluid (the damping medium is illustrated as a plurality of black dots in FIG. 5 and FIG. 6). The passages 50 of the piston 24 and the passages 48 of the base 28 are configured to allow the damping medium to pass through. The control member 30 and the resilient member 32 are located between passage openings E1 of the passages 48 of the base 28 and passage openings E2 of the passages 50 of the piston 24.

The inner wall 38 of the housing 22 has a first inner diameter S1 and a second inner diameter S2 from the top portion 42 to the bottom portion 40 of the housing 22. Preferably, the inner wall 38 further has a third inner diameter S3. In the present embodiment, the inner wall 38 of the housing 22 has the first inner diameter S1, the second inner diameter S2 and the third inner diameter S3 arranged in order from the top portion 42 to the bottom portion 40 of the housing 22, wherein the first inner diameter S1 is greater than the second inner diameter S2, and the second inner diameter S2 is greater than the third inner diameter S3. It is noticed that the housing 22 has a frontal section 220, a middle section 221 and an end section 222 in order from the top portion 42 to the bottom portion 40 of the housing 22. As shown in FIG. 5, the inner wall 38 has the first inner diameter S1 located corresponding to the frontal section 220, the inner wall 38 has the second inner diameter S2 located corresponding to the middle section 221, and the inner wall 38 has the third inner diameter S3 located corresponding to the end section 222, respectively. According to the arrangement, the damping device 20 is capable of providing a damping effect with a substantially gradual increment along the frontal section 220, the middle section 221 and the end section 222 of the housing 22. Further, the inner wall 38 of the frontal section 220 and the inner wall 38 of the end section 222 are both cylindrical surfaces, and the inner wall 38 of the middle section 221 is a truncated cone surface. The truncated cone surface (i.e. the inner wall 38 of the middle section 221) is connected to both of the cylindrical surfaces (i.e. the inner wall 38 of the frontal section 220 and the inner wall 38 of the end section 222). Thereby, the damping device 20 is capable of providing a first constant damping effect in the frontal section 220 and a second constant damping effect in the end section 222. Besides, the damping device 20 is capable of providing the damping effect with the substantially gradual increment in the middle section 221. Besides, the housing 22 has an outer diameter OD, and the outer diameter OD of the housing 22 retains a constant value from the top portion 42 to the bottom portion 40 of the housing 22. That is, the outer diameter OD corresponding to the frontal section 220, the outer diameter OD corresponding to the middle section 221 and the outer diameter OD corresponding to the end section 222 are equal to one another. The arrangement where the outer diameter OD of the housing 22 retains the constant value from the top portion 42 to the bottom portion 40 of the housing 22 ensures the damping device 20 not to require an extra externally mechanical space, so that the damping device 20 is able to be implemented to the same apparatus (for example, the furniture part) due to no requirement of the extra externally mechanical space.

In addition, the base 28 is connected to the second side 24b of the piston 24 via the extending portion 52. On the other hand, the control member 30 and the resilient member 32 are movable between the passages 48 of the base 28 and the passages 50 of the piston 24 along the extending portion 52. Besides, the passages 50 of the piston 24 communicate with the first side 24a and the second side 24b of the piston 24.

As shown in FIG. 7 and FIG. 8, when the piston 24 is moved relative to the housing 22 by a damping speed, for example, one of the piston 24 and the housing 22 is displaced relative to the other one of the piston 24 and the housing 22, the damping device 20 is able to provide a damping effect. The damping effect provided by the damping device 20 can be various according to different conditions. In the present embodiment, it is illustrative of an example that the piston 24 receiving a force (or an external force) via the extending member 26 to move the piston 24 relative to the housing 22.

In the first condition, for example, a first force F1 is exerted to the extending member 26 or the piston 24 and causes the extending member 26 or the piston 24 to generate a first speed, and the piston 24 can pass through the chamber 36 defined by the first inner diameter S1, the second inner diameter S2 and the third inner diameter S3 in order (FIG. 7 and FIG. 8 only illustrate the piston 24 being located in the end section of the interior of the chamber 36 defined by the second inner diameter S2). During the process, the damping medium in the second zone R2 (the damping medium is illustrated as a plurality of black dots in FIG. 7 and FIG. 8) flows towards the said first zone R1 in response to the first force F1 and generates a first corresponding force F1'. Specifically, the fluid of the damping medium can flow from a zone of the second side 24b of the piston 24 to a zone of the first side 24a of the piston 24, so as to generate the first corresponding force F1'. Hereinafter, the fluid of the damping medium can flow out from the passage openings E1 of the passages 48 of the base 28, and then reaches the zone of the first side 24a of the piston 24 through the passages 50 of the piston 24 and a clearance between the peripheral of the piston 24 and the inner wall 38 of the housing 22, respectively. The control member 30 and the resilient member 32 can be driven by the first corresponding force F1' and taken away from the passage openings E1 of the base 28 to approach the passage openings E2 of the piston 24, so as to control the flow rate of the damping medium from the second side 24b to the first side 24a through the passages 50 of the piston 24. In other words, the control member 30 is capable of being moved towards the passages 50 of the piston 24 according to the damping speed. Herein, the resilient member 32 generates a resilient force in response to the damping speed. For example, the resilient member 32 can be moved to abut against a surface 55 of the second side 24b of the piston 24. Thereby, the damping device 20 is able to provide a first damping effect in response to the first condition. Herein, the spring 34 accumulates an elastic force in response to the displacement of the piston 24. When the elastic force is released, the elastic force is configured to recover the piston 24 and the housing 22 to the pre-damping state shown in the FIG. 5.

As shown in FIG. 9 and FIG. 10, in the second condition, for example, a second force F2 is exerted to the extending member 26 or the piston 24 and causes the extending member 26 or the piston 24 to generate a second speed, and the second speed is greater than the first speed. The piston 24 can pass through the chamber 36 defined by the first inner diameter S1, the second inner diameter S2 and the third inner diameter S3 in order (FIG. 9 and FIG. 10 only illustrate the piston 24 being located in the chamber 36 defined by the third inner diameter S3). At this time, the damping medium (the damping medium is illustrated as a plurality of black dots in FIG. 9 and FIG. 10) generates a second corresponding force F2' in response to the second force F2 and against the second force F2. Specifically, the fluid of the damping medium flows from the zone of the second side 24b of the piston 24 to the zone of first side 24a of the piston 24 for generating the second corresponding force F2'. Herein, the second corresponding force F2' is able to drive the control member 30 and the resilient member 32 to depart from the passage openings E1 of the base 28 and approach the passage openings E2 of the piston 24. Preferably, the control member 30 is located in a predetermined position X adjacent to the second side 24b of the piston 24 in response to the second corresponding force F2', such that the control member 30 is able to close a portion or all portions of the passages 50 of the piston 24, so as to control the flow rate of the damping medium passing through the passages 50 of the piston 24 to increase the damping force. The resilient member 32 is located in the predetermined position X in response to the control member 30 and accumulates a resilient force F3. That is, the control member 30 can close the portion or the all portions of the passages 50 of the piston 24 according to the damping speed, so as to control the flow rate of the damping medium passing through the passages 50 of the piston 24. For example, when the second corresponding force F2' is exerted to the control member 30 which has closed the passages 50 of the piston 24, the flow rate of the damping medium passing through the passages 50 of the piston 24 from the zone of the second side 24b of the piston 24 to the zone of the first side 24a of the piston 24 will be reduced or cut off. Therefore, when the control member 30 closes the passages 50 of the piston 24 and the fluid of the damping medium flows out from the passage openings E1 of the passages 48 of the base 28, the fluid of the damping medium reaches the zone of the first side 24a of the piston 24 through the clearance between the peripheral of the piston 24 and the inner wall 38 of the housing 22, which results in a significant damping force. On the other hand, the resilient member 32 deforms elastically due to abutting against the surface 55 of the piston 24 and accumulates the resilient force F3. Thereby, it is known that the damping device 20 can provide a second damping effect according to the second condition.

In a third condition or in a pre-damping condition, when the piston 24 is located in the chamber 36 defined by the first inner diameter S1, the second inner diameter S2 and the third inner diameter S3 (FIG. 9 and FIG. 10 only illustrate the piston 24 being located in the chamber 36 defined by the third inner diameter S3) and the second force F2 is exerted to the piston 24 (in the third condition, the second force F2 is an impulse or a sudden excessive force), similar to the second condition, the control member 30 is capable of closing at least the portion or all portions of the passages 50 of the piston 24 in response to the second corresponding force F2' to increase the damping force, and the resilient member 32 accumulates the resilient force F3. As shown in FIG. 10, FIG. 11 and FIG. 12, once a speed of the second force F2 exerted to the piston 24 or the extending member 26 is decreased to a certain degree by the said increased damping force, or the second force F2 decreases less than the resilient force F3 accumulated by the resilient member 32, the resilient member 32 will release the resilient force F3 and the resilient force F3 is exerted to the control member 30, such that the control member 30 is moved away from the predetermined position X and no longer close the passages 50 of the piston 24. Thereby, the damping device 20 provides a weaker damping force in response to the third condition changing from the second damping effect. That is, the damping device 20 is able to provide a variable damping effect.

Figure 13:
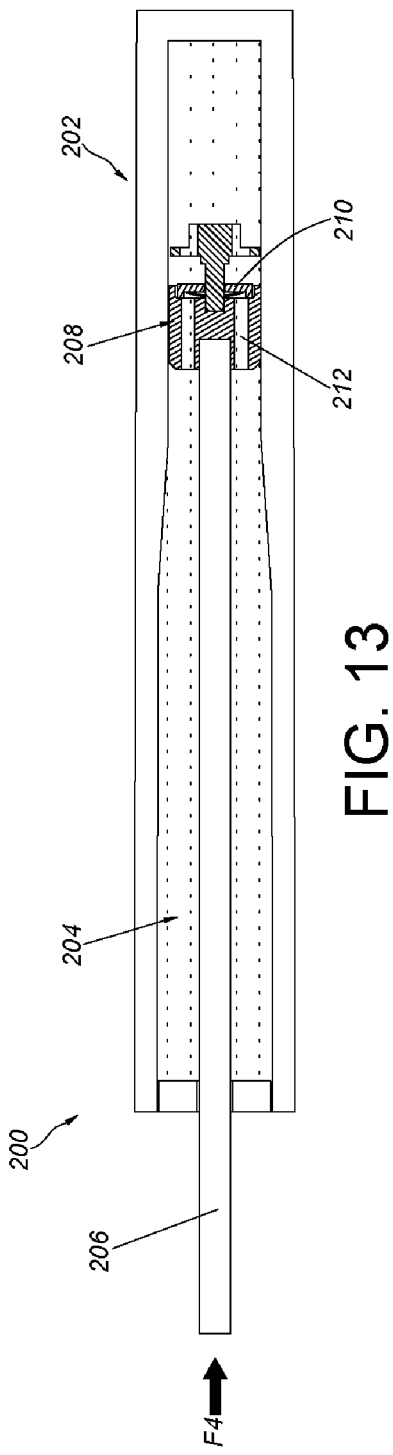
FIG. 13 is a diagram of a damping device with a piston being forced according to a second embodiment of the present invention.
Figure 14:
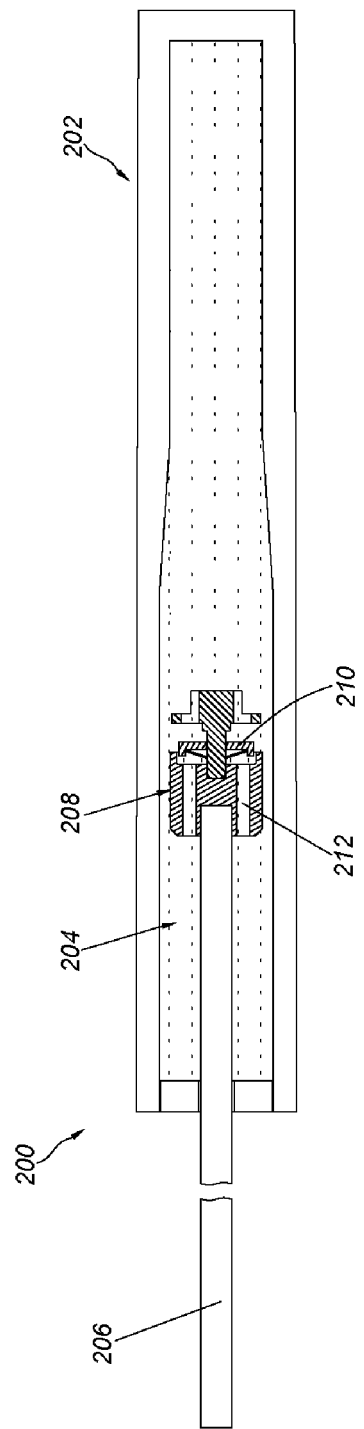
FIG. 14 is a diagram of the damping device with the piston not being forced according to the second embodiment of the present invention.

FIG. 13 and FIG. 14 are diagrams illustrating a damping device 200 according to a second embodiment of the present invention. Specifically, a major difference between the damping device 200 according to the second embodiment and the damping device 20 according to the first embodiment is that the said spring 34 is omitted in the damping device 200. Furthermore, a chamber 204 in a housing 202 of the damping device 200 is filled with a damping medium. The said damping medium includes a fluid (the damping medium is illustrated as a plurality of black dots in FIG. 13 and FIG. 14). The chamber 204 is pressurized in advance. When an extending member 206 or a piston 208 receives a force F4 (or an external force), a control member 210 is capable of closing a portion or all portions of passages 212 of the piston 208. Once the force F4 stops, a pressure in the chamber 204 is able to drive the fluid of the damping medium to gradually activate the piston 208, leading the piston 208 and the housing 202 to recover to the pre-damping state (as shown in FIG. 14).

Figure 15:
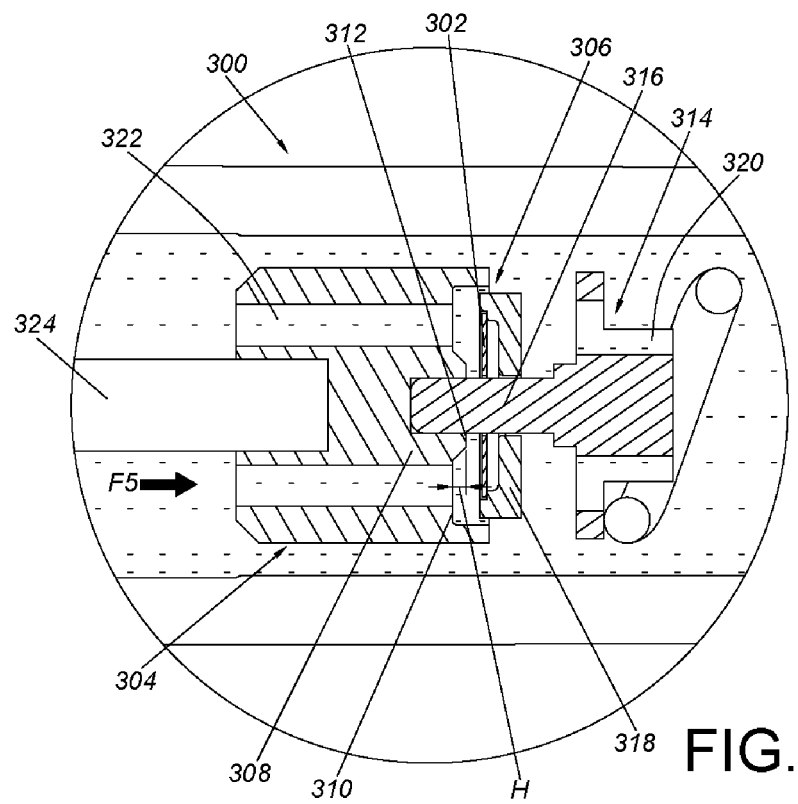
FIG. 15 is a diagram of a damping device with a controller not closing a passage of a piston according to a third embodiment of the present invention.
Figure 16:
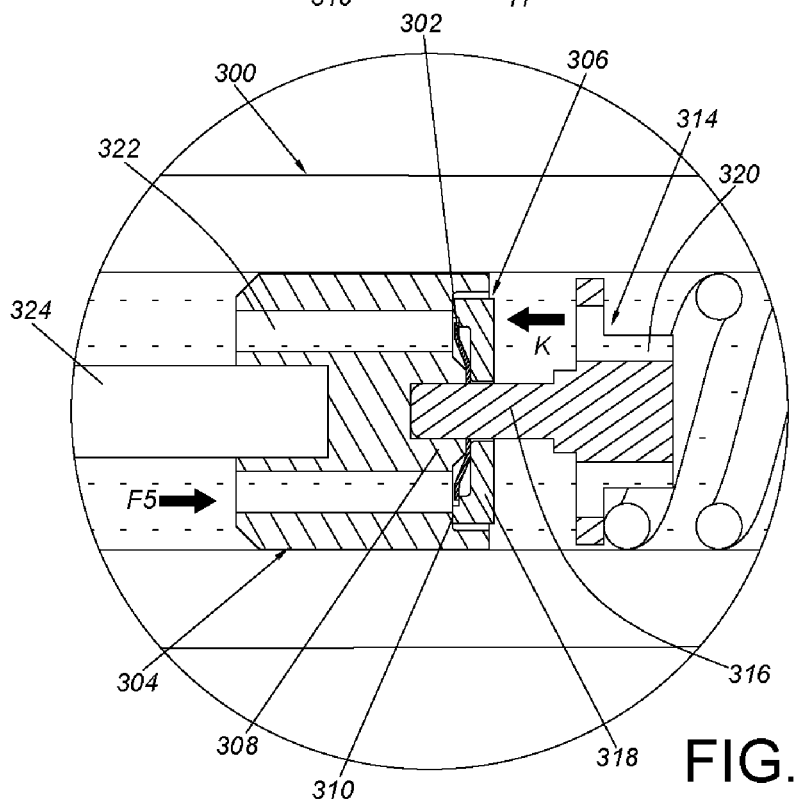
FIG. 16 is a diagram of the damping device with the controller closing the passage of the piston according to the third embodiment of the present invention.

FIG. 15 and FIG. 16 are diagrams illustrating a damping device 300 according to a third embodiment of the present invention. Specifically, a major difference between the damping device 300 according to the third embodiment and the damping devices 20, 200 according to the first and the second embodiment respectively is that a resilient member 302 is a flat sheet and a second side 306 of a piston 304 includes a connecting portion 308 and a contacting portion 310. A surface 312 of the connecting portion 308 and the contacting portion 310 are spaced by a step difference H. Furthermore, a base 314 is connected to the connecting portion 308 of the piston 304 via an extending portion 316. On the other hand, a control member 318 and the resilient member 302 are movable between passages 320 of the base 314 and passages 322 of the piston 304 along the extending portion 316. When the extending member 324 or the piston 304 receives a force F5 (or an external force), in a pre-damping state, the control member 318 is capable of abutting against the contacting portion 310 of the piston 304 in response to a corresponding force K of a fluid of a damping medium, so as to close a portion or all portions of the passages 322 of the piston 304 for controlling a flow rate of the damping medium passing through the passages 322 of the piston 304. Thus, the damping force increases accordingly. The resilient member 302 abuts against the surface 312 of the connecting portion 308 of the piston 304 and deforms elastically through the step difference H, so as to accumulate a resilient force. When the force F5 decreases and the resilient member 302 releases the resilient force, the control member 318 no longer closes the passages 322 of the piston 304.

Figure 17:
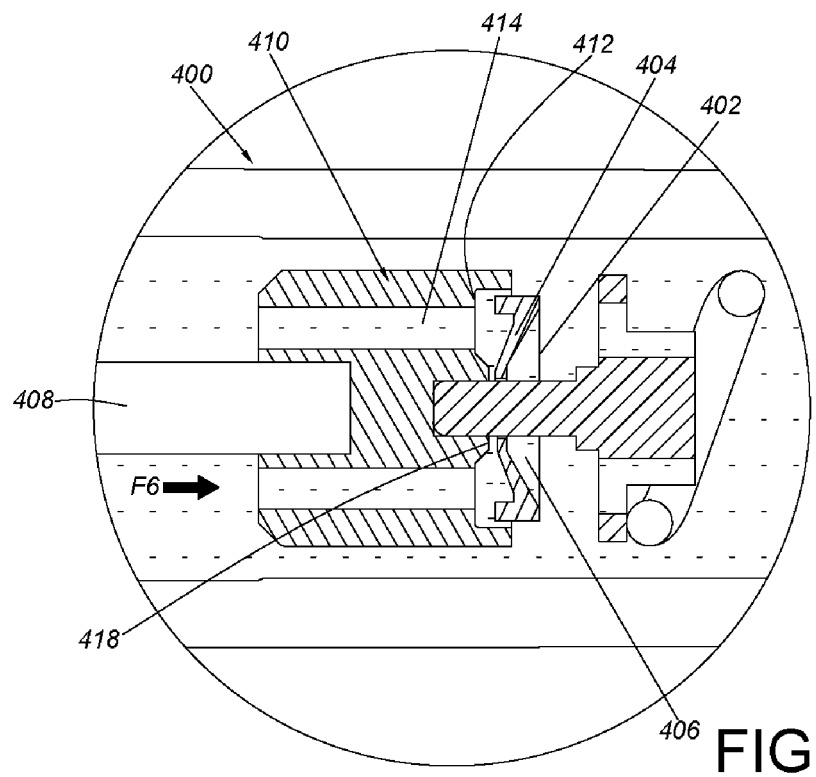
FIG. 17 is a diagram of a damping device with a controller not closing a passage of a piston according to a fourth embodiment of the present invention.
Figure 18:
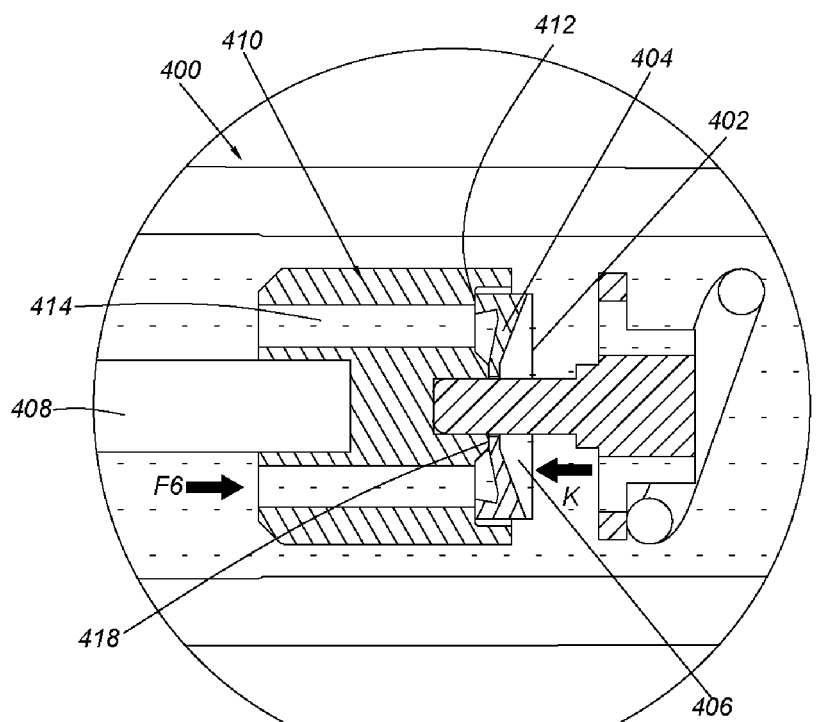
FIG. 18 is a diagram of the damping device with the controller closing the passage of the piston according to the fourth embodiment of the present invention.

FIG. 17 and FIG. 18 are diagrams illustrating a damping device 400 according to a fourth embodiment of the present invention. Specifically, a major difference between the damping device 400 according to the fourth embodiment and the damping devices 20, 200, 300 according to the first, the second and the third embodiment respectively is that a control member 402 and a resilient member 404 are integrally formed as a part. Moreover, an appearance of a controller formed by the control member 402 and the resilient member 404 is a disc spring. A concave portion 406 is defined between the resilient member 404 and the control member 402. When an extending member 408 or a piston 410 receives a force F6 (or an external force), in a pre-damping condition, the control member 402 is capable of abutting against a contacting portion 412 of the piston 410 in response to a corresponding force K of a fluid of a damping medium, so as to close a portion or all portions of passages 414 of the piston 410 for controlling a flow rate of the damping medium passing through the passages 414 of the piston 410. Thus, a damping force increases accordingly. The resilient member 404 abuts against a surface 418 of a connecting portion of the piston 410, so as to provide a resilient force. When the force F6 decreases and the resilient member 404 releases the resilient force, the control member 402 no longer closes the passages 414 of the piston 410. It is noticed that the concave portion 406 facilitates the corresponding force K of the fluid of the damping medium to drive the control member 402 for closing the passages 414 of the piston 410.

Figure 19:
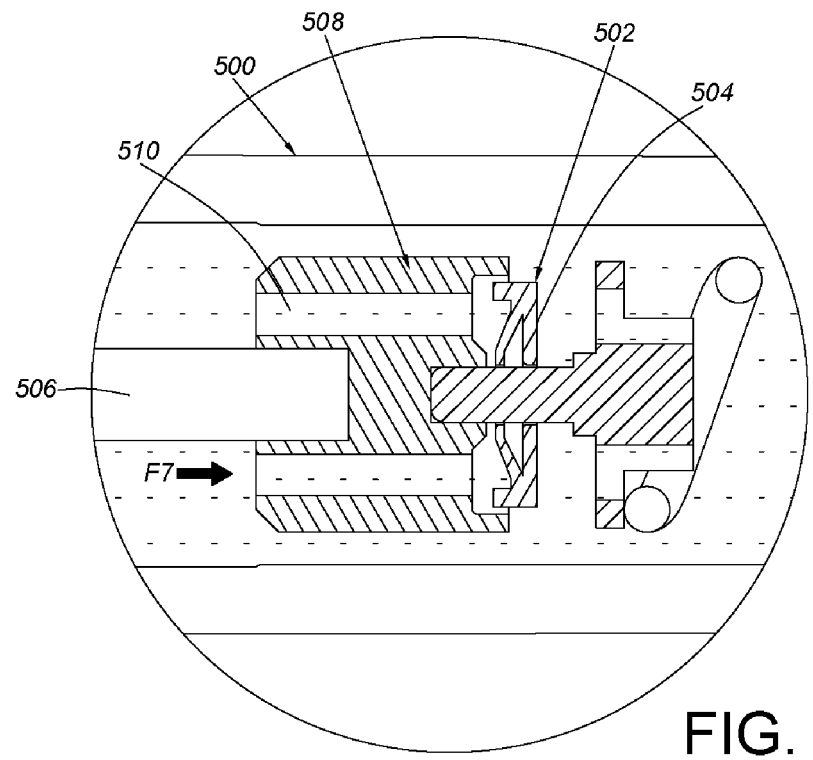
FIG. 19 is a diagram of a damping device with a controller not closing a passage of a piston according to a fifth embodiment of the present invention.
Figure 20:
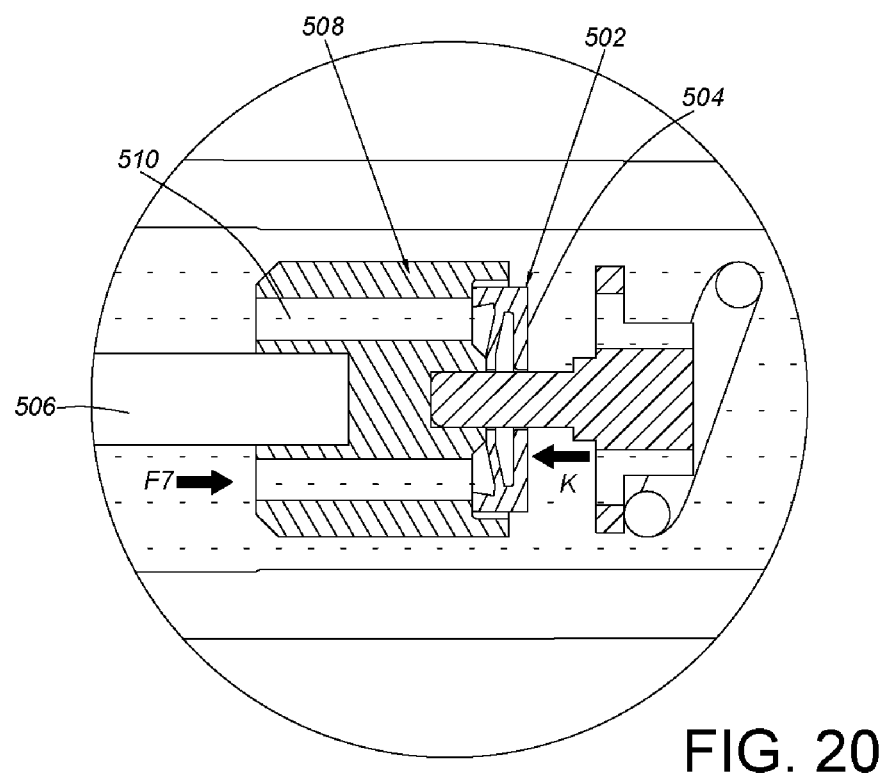
FIG. 20 is a diagram of the damping device with the controller closing the passage of the piston according to the fifth embodiment of the present invention.

FIG. 19 and FIG. 20 are diagrams illustrating a damping device 500 according to a fifth embodiment of the present invention. Specifically, a major difference between the damping device 500 according to the fifth embodiment and the damping device 400 according to the fourth embodiment is that no concave portion 406 is defined between the resilient member 404 and the control member 402. Specifically, a side 504 of a control member 502 is a plane. Therefore, when an extending member 506 or a piston 508 receives a force F7 (or an external force), in a pre-damping condition, the control member 502 is capable of receiving a corresponding force K of a fluid of a damping medium through the side 504, so as to close a portion or all portions of passages 510 of the piston 508. Namely, this embodiment is able to provide the functions mentioned above.

Figure 21:
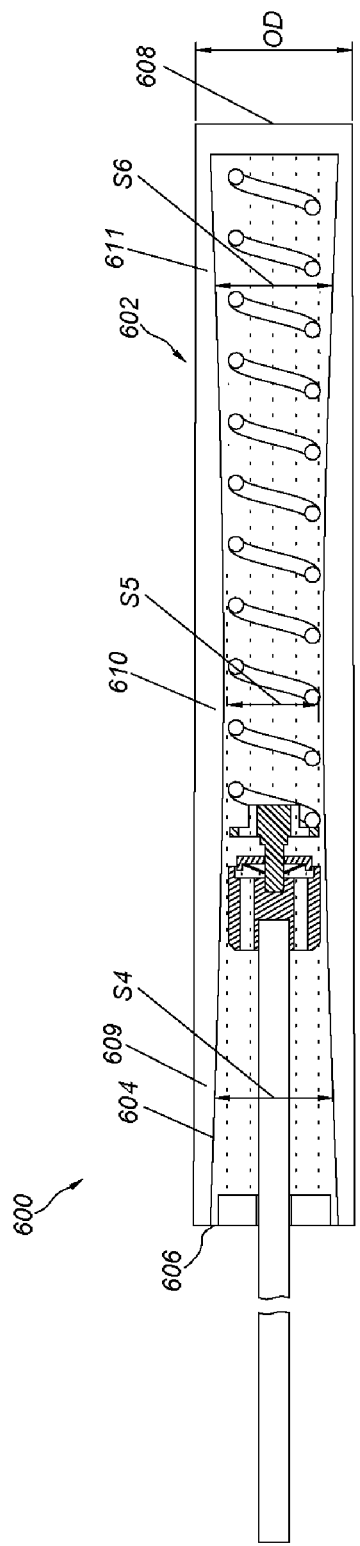
FIG. 21 is an internal diagram of a damping device according to a sixth embodiment of the present invention.

FIG. 21 is a diagram illustrating a damping device 600 according to a sixth embodiment of the present invention. Specifically, a major difference between the damping device 600 according to the sixth embodiment and the damping devices according to the first to the fifth embodiments is that an inner wall 604 of a housing 602 has a first inner diameter S4, a second inner diameter S5 and a third inner diameter S6 arranged in order from a top portion 606 to a bottom portion 608 of the housing 602, wherein the first inner diameter S4 is greater than the second inner diameter S5, and the third inner diameter S6 is greater than the second inner diameter S5. It is noticed that the housing 602 has a frontal section 609, a middle section 610 and an end section 611 in order from the top portion 606 to the bottom portion 608 of the housing 602. As shown in FIG. 21, the inner wall 604 has the first inner diameter S4 located corresponding to the frontal section 609, the inner wall 604 has the second inner diameter S5 located corresponding to the middle section 610, and the inner wall 604 has the third inner diameter S6 located corresponding to the end section 611, respectively. According to the arrangement, the damping device 600 is capable of providing a non-gradual damping effect along the frontal section 609, the middle section 610 and the end section 611 of the housing 602 substantially. Further, the inner wall 604 of the frontal section 609, the inner wall 604 of the middle section 610 and the inner wall 604 of the end section 611 are connected to one another to form a camber. A vertex of the camber is located on the inner wall 604 of the middle section 610, and the second inner diameter S5 of the inner wall 604 of the middle section 610 is a distance between two opposite vertices on a cross-section of the inner wall 604 of the middle section 610. Besides, the housing 602 has an outer diameter OD, and the outer diameter OD of the housing 602 retains a constant value from the top portion 606 to the bottom portion 608 of the housing 602. That is, the outer diameter OD corresponding to the frontal section 609, the outer diameter OD corresponding to the middle section 610 and the outer diameter OD corresponding to the end section 611 are equal to one another. The arrangement where the outer diameter OD of the housing 602 retains the constant value from the top portion 606 to the bottom portion 608 of the housing 602 ensures the damping device 600 not to require an extra externally mechanical space, so that the damping device 600 is able to be implemented to the same apparatus (for example, the furniture part) due to no requirement of the extra externally mechanical space.

Figure 22:
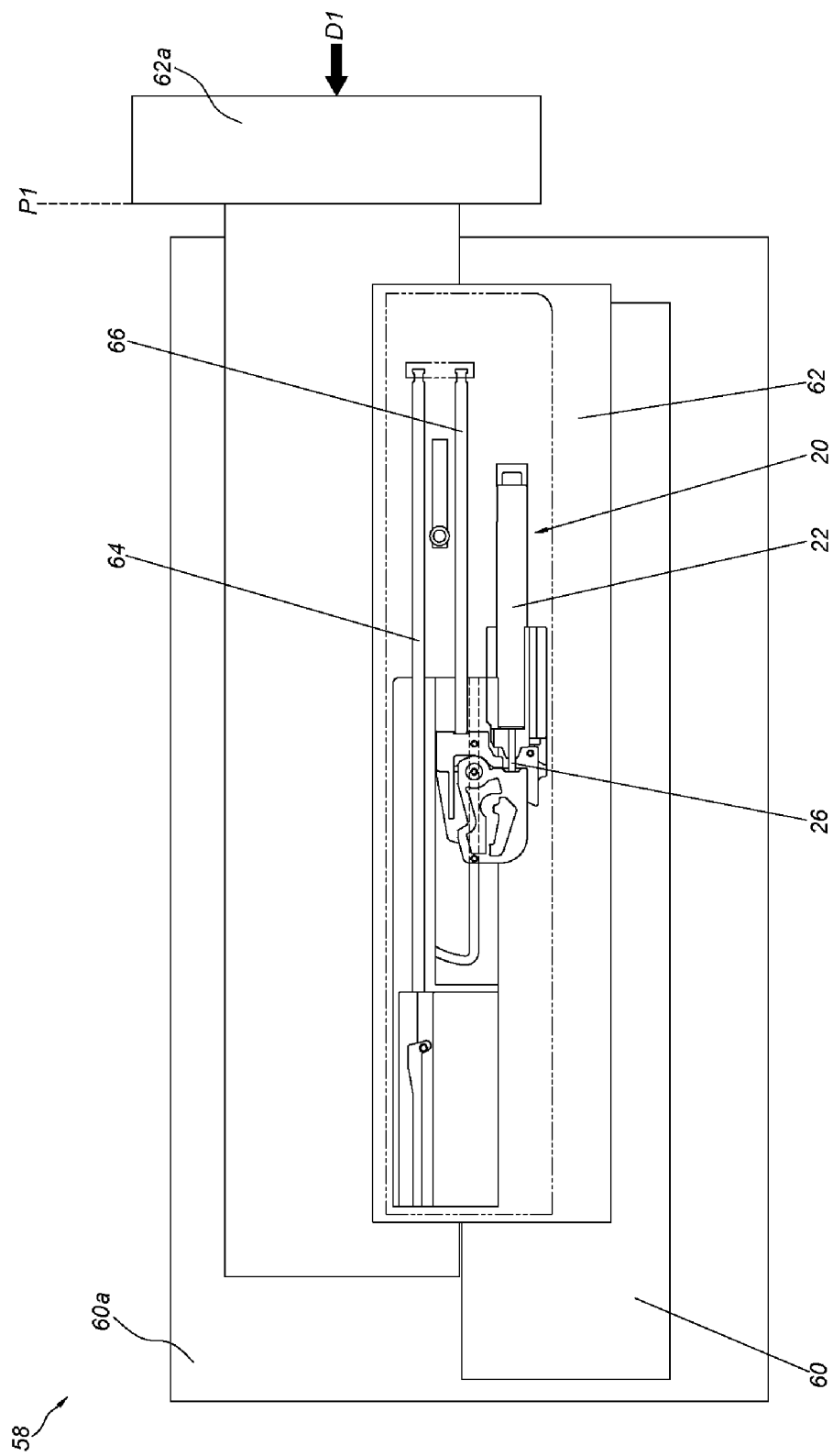
FIG. 22 is a diagram showing that the damping device is applied to a furniture part and a second furniture member is in the first position relative to a first furniture member according to the first embodiment of the present invention.

As shown in FIG. 22, the said damping devices according to each of the embodiments can be implemented in a furniture part 58. Hereinafter, the damping device 20 implemented in the furniture part 58 is illustrative of an example. Specifically, the furniture part 58 includes a first furniture member 60, a second furniture member 62 and a driving mechanism. The first furniture member 60, for example, is a first rail (stationery rail) fixed to a cabinet body 60a. On the other hand, the second furniture member 62, for example, is a second rail (sliding rail) movable relative to the first rail, and the second furniture member 62 is configured to mount a drawer 62a. The driving mechanism includes an ejection device 64 and a retraction device 66, wherein the second furniture member 62 (drawer 62a) is in a first position P1 (for example, a closed position) relative to the first furniture member 60 (cabinet body 60a).

Figure 23:
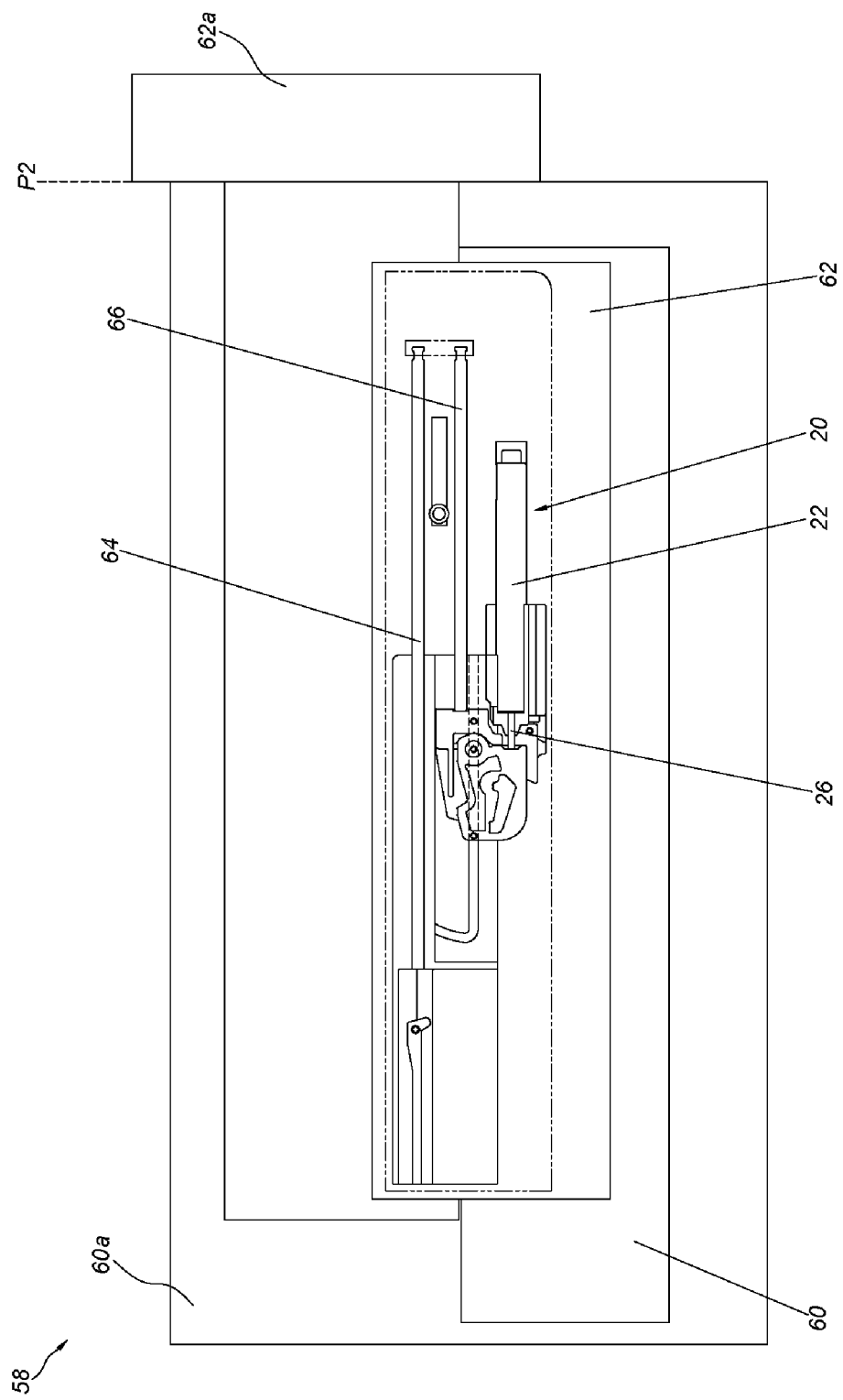
FIG. 23 is a diagram of the second furniture member being located in a second position relative to the first furniture member according to the first embodiment of the present invention.
Figure 24:
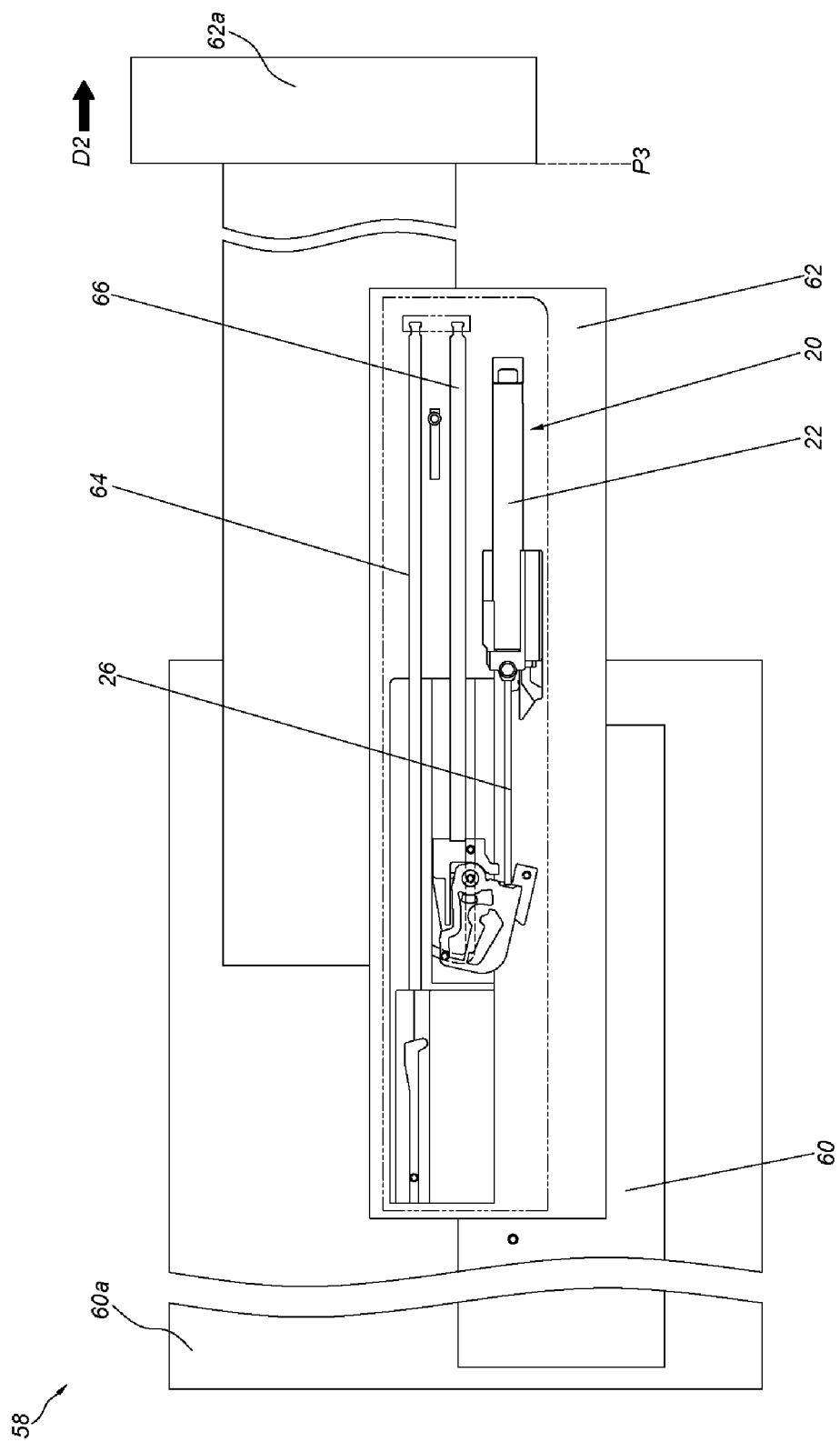
FIG. 24 is a diagram of the second furniture member being located in a third position relative to the first furniture member according to the first embodiment of the present invention.

Referring to FIG. 22, FIG. 23 and FIG. 24, when the second furniture member 62 is pressed by a user and displaced from the first position P1 to a second position P2 (for example, an over-pressed position shown in FIG. 23) in a first direction D1 relative to the first furniture member 60 and the user releases the pressing force, the ejection device 64 including an opening spring will provide an opening force, so that the second furniture member 62 is moved, in response to the opening force, to a third position P3 (for example, an open position shown in FIG. 24) in a second direction D2 opposite to the first direction D1. That is a so-called self-opening function. During a final step where the second furniture member 62 is pushed by the user to be moved from the third position P3 to approach the first position P1 in the first direction D1 relative to the first furniture member 60, the retraction device 66 including a closing spring provides a closing force, so that the second furniture member 62 is moved to the first position P1. That is a so-called self-closing function. Since the self-opening function and the self-closing function are well-known by one of ordinary skill in the art, the detailed description is omitted herein for simplicity. On the other hand, by a relative motion between the piston 24 (or the extending member 26) and the housing 22 of the damping device 20 is able to provide a damping effect to the second furniture member 62 during a process where the second furniture member 62 is moved toward the first position P1 in response to the closing force.

Figure 25:
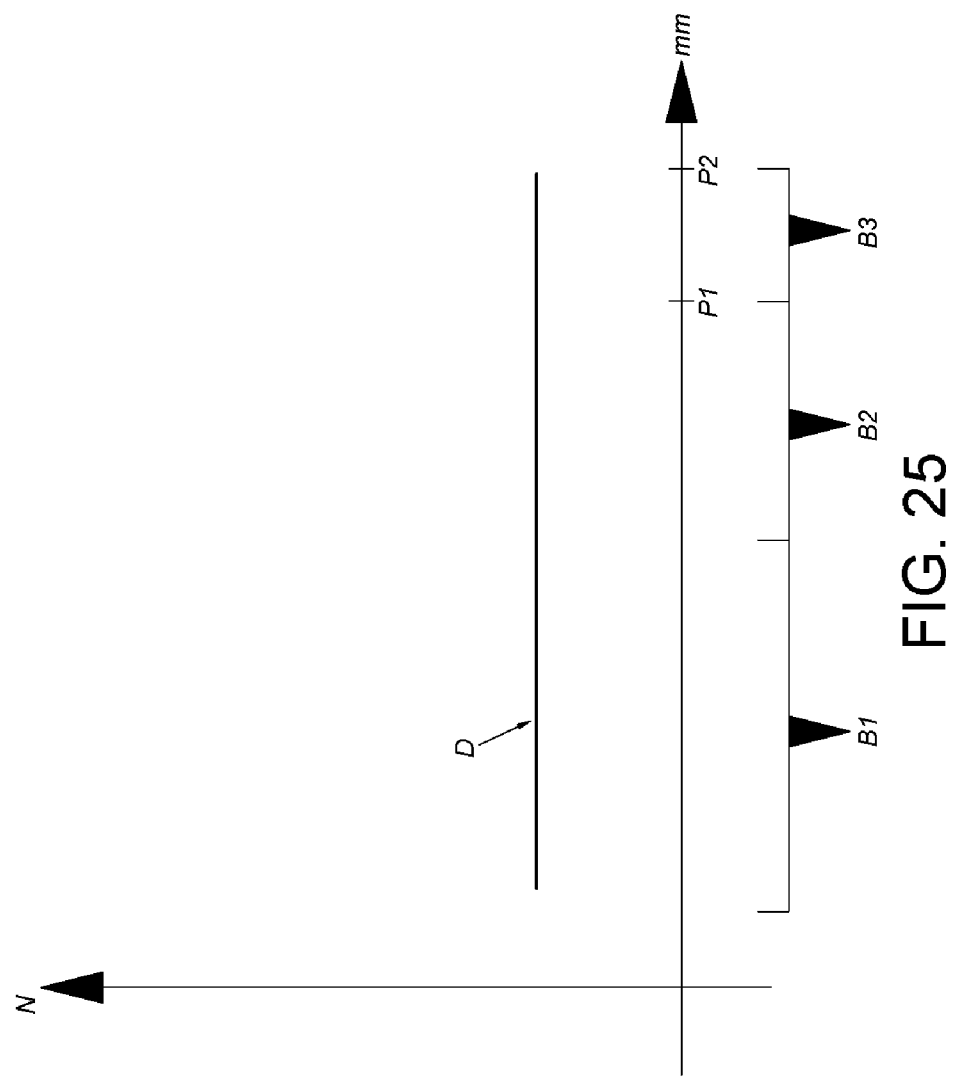
FIG. 25 is a diagram of a damping force provided by the damping device under a first condition according to the first embodiment of the present invention.

A curve diagram of the damping force according to the first condition is shown in FIG. 25, wherein the vertical axis represents a force in Newton (N), and the horizontal axis represents a distance in millimeter (mm).

For example, when the second furniture member 62 is moved from the third position P3 toward the first position P1 in the first direction D1 using the damping device 20 for providing the damping force, according to the said first condition (this part can be referred to FIG. 7 and FIG. 8), the fluid of the damping medium can flow out from the passage openings E1 of the passages 48 of the base 28, and reach the zone of the first side 24a of the piston 24 through the passages 50 of the piston 24. Therefore, during a process where the damping force D reaches a main damping zone B2 from a pre-damping zone B1 (as the said pre-damping state) which is in front of the first position P1, the damping force D is able to substantially retain the same in response to the first force (for example, the closing force of the retraction device 66) exerted to the second furniture member 62. In other words, the damping device 20 can provide the first damping effect before the second furniture member 62 reaches the first position P1, so as to decrease a velocity of the second furniture member 62 before reaching the first position P1. Besides, an over-pressed zone B3 is defined between the first position P1 and the second position P2.

Otherwise, when the second furniture member 62 is moved from the third position P3 toward the first position P1 in the first direction D1 and the damping force is provided by the damping device 20, according to the said second condition (this part can be referred to FIG. 9 and FIG. 10), the control member 30 is capable of closing the portion or the all portions of the passages 50 of the piston 24, so as to control the flow rate of the damping medium passing through the passages 50 of the piston 24 from the zone of the second side 24b to the zone of the first side 24a of the piston 24. Therefore, as shown in FIG. 26, during the process where the damping force D reaches the main damping zone B2 from the pre-damping zone B1 in front of the first position P1, the damping force D will rise greatly in response to the second force (for example, a continual excessive force exerted by the user to the second furniture member 62). In other words, the damping device 20 can provide the second damping effect before the second furniture member 62 reaches the first position P1, so as to rapidly decelerate the second furniture member 62.

Otherwise, when the second furniture member 62 is moved from the third position P3 toward the first position P1 in the first direction D1 and the damping force is provided by the damping device 20, according to the said third condition (this part can be referred to FIG. 9 to FIG. 12), the control member 30 is capable of closing the portion or the all portions of the passages 50 of the piston 24, so as to control the flow rate of the damping medium passing through the passages 50 of the piston 24 from the zone of the second side 24b of the piston 24 to the zone of the first side 24a. Besides, when the second force exerted to the second furniture 62 (for example, an instant excessive force exerted to the second furniture member 62 by the user) decreases to a certain degree, the resilient member 32 releases the resilient force to the control member 30, and the control member 30 departs from the predetermined position X and no longer closes the passages 50 of the piston 24. Therefore, the second damping effect is switched to the third damping effect with the weaker damping force. Accordingly, as shown in FIG. 27, during the process where the damping force D reaches the main damping zone B2 from the pre-damping zone B1 in front of the first position P1, the damping force D will rise greatly in response to the second force, and the damping force D decreases rapidly before the second furniture member 62 reaches the first position P1.

Thereby, the damping device 20 is capable of providing damping effects with different degree according to various external forces. When an instant pushing force toward the first direction D1, exerted by the user during the process where the second furniture member 62 is moved from the third position P3 relative to the first furniture member 60, is excessive, by the second or the third damping effect provided by the damping device 20 will decrease the force exerted to the second furniture member 62 (drawer 62a) rapidly, so as to prevent the second furniture member 62 (drawer 62a) from directly passing the first position P1 to the second position P2 from the third position P3 relative to the first furniture member 60 (cabinet body 60a). It prevents the ejection device 64 providing an opening force from an unintentional activation (without intention). That is, during the final step where the second furniture member 62 is moved from the third position P3 to the first position P1, it effectively ensures that the second furniture member 62 is stopped in the first position P1 by the damping device 20, so as to enhance the stability and reliability of the driving mechanism.

Accordingly, the embodiment of the present invention includes following features:

1. The damping device is able to generate a damping force correspondingly in response to a force (or an external force). The damping device can provide at least two damping effects with different degree to increase the stability and reliability of the driving mechanism in use.

2. The control member can depart from the predetermined position and no longer closes the passages of the piston through the resilient member releasing the resilient force and the resilient force being exerted to the control member.

3. The damping device can be implemented in a furniture part with a self-opening function or with both of a self-opening function and a self-closing function. The damping device can prevent an unintentional opening resulting from the second furniture member pushed directly from the third position (for example, the open position) to the second position (for example, the over-pressed position).

4. The inner wall of the housing of the damping device has a plurality of determined inner diameters, and the determined inner diameters facilitate the damping device to provide specific damping effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A damping device, comprising:
a housing having an inner wall, a top portion and a bottom portion, the inner wall having a first inner diameter and a second inner diameter from the top portion to the bottom portion, and the first inner diameter being greater than the second inner diameter;
a chamber being defined by the inner wall and having a damping medium filled therewith;
a base movable in the chamber of the housing;
a piston movable in the chamber of the housing, both of the base and the piston comprising at least one passage for allowing the damping medium to pass through; and
a controller arranged in the chamber of the housing, the controller comprising a control member and a resilient member;
a spring directly connected to the base, the spring configured to provide an elastic force to one of the piston and the base;
wherein the chamber between the piston and the top portion of the housing defines a first zone, the chamber between the piston and the bottom portion of the housing defines a second zone, the damping medium is filled in the first zone and the second zone, and the first zone communicates with the second zone via the at least one passage of the base and the piston;
wherein when the piston is moved relative to the housing by a damping speed, the control member is moved toward the passage of the piston or closes a portion or all portions of the passage of the piston in response to the damping speed;
wherein when the control member closes the portion or the all portions of the passage of the piston, the control member is capable of controlling an amount of the damping medium passing through the passage of the piston;
wherein the spring and the base are located in the second zone, and when the damping device is providing a damping effect, the piston is moved from a position in the housing with the first inner diameter to a position in the housing with the second inner diameter.

2. The damping device of claim 1, wherein the resilient member generates a resilient force to the control member in response to the damping speed, and the controller is disposed between the piston and the base, wherein the base is connected to the piston via an extending portion, and the controller is movably mounted on the extending portion.

3. The damping device of claim 1, wherein the piston is moved in the chamber of the housing in a substantially linear direction.

4. The damping device of claim 1, wherein the resilient member is a disc spring.

5. The damping device of claim 1, wherein the control member defines a space, and the space is for accommodating the resilient member.

6. The damping device of claim 4, wherein the piston comprises a connecting portion and a contacting portion, the connecting portion and the contacting portion are spaced by a step difference, the base is connected to the connecting portion of the piston via an extending portion, and the resilient member deforms elastically through the step difference.

7. The damping device of claim 1, wherein the control member and the resilient member are integrally formed as a unitary part.

8. The damping device of claim 7, wherein the piston comprises a connecting portion and a contacting portion, the connecting portion and the contacting portion are spaced by a step difference, the base is connected to the connecting portion of the piston via an extending portion, and the resilient member deforms elastically through the step difference.

9. The damping device of claim 1, further comprising an extending member movable relative to the housing via the piston, and a portion of the extending member extending out of the chamber.

10. The damping device of claim 1, wherein the inner wall has the first inner diameter, the second inner diameter and a third inner diameter from the top portion to the bottom portion of the housing, and the second inner diameter is greater than the third inner diameter.

11. A damping device, comprising:
a housing having an inner wall, a top portion and a bottom portion, the inner wall defining a chamber and having a first inner diameter and a second inner diameter from the top portion to the bottom portion, the first inner diameter being greater than the second inner diameter, and the chamber having a damping medium filled therewith;
a piston movable in the chamber, wherein the chamber between the piston and the top portion of the housing defines a first zone, the chamber between the piston and the bottom portion of the housing defines a second zone, and the damping medium is filled in the first zone and the second zone;
a base movable in the chamber with the piston, and both of the base and the piston comprising a passage respectively for allowing the damping medium to pass through, such that the first zone communicates with the second zone;
a spring directly connected to the base, the spring configured to provide an elastic force to one of the piston and the base; and
a controller located between the passage of the base and the passage of the piston;
wherein the spring and the base are located in the second zone, and when the damping device is providing a damping effect, the piston is moved from a position in the housing with the first inner diameter to a position in the housing with the second inner diameter.

12. The damping device of claim 11, wherein the base is connected to the piston via an extending portion, and the controller is movably mounted on the extending portion.

13. The damping device of claim 12, wherein the controller comprises a control member and a resilient member, when the control member is in a predetermined position, the control member is capable of closing a portion or all portions of the passage of the piston, the resilient member provides a resilient force corresponding to the predetermined position, and when the resilient force is released, the control member departs from the predetermined position.

14. The damping device of claim 12, further comprising an extending member, the extending member being movable relative to the housing via the piston.

* * * * *